US005679210A

United States Patent [19]

Thomas

[11] Patent Number: 5,679,210

[45] Date of Patent: Oct. 21, 1997

[54] LABEL REMOVAL APPARATUS

[76] Inventor: Robert Thomas, 1013 Francis Blvd., New Kensington, Pa. 15068

[21] Appl. No.: 358,749

[22] Filed: Dec. 19, 1994

[51] Int. Cl.$^6$ .......... B32B 35/00

[52] U.S. Cl. .......... 156/584; 156/344; 30/162

[58] Field of Search .......... 156/344, 584, 156/526, 530; 30/162, 320, 335, 336, 338

[56] References Cited

U.S. PATENT DOCUMENTS

| | | | |
|---|---|---|---|
| 413,225 | 10/1889 | Coates | 30/162 |
| 1,529,336 | 3/1925 | Wisniewski | 30/162 |
| 2,549,542 | 4/1951 | Stair | 30/162 |
| 2,550,346 | 4/1951 | Gregg | 30/162 |
| 2,692,580 | 10/1954 | Kahn et al. | 30/162 X |
| 2,848,809 | 8/1958 | Crowder | 30/162 |
| 3,657,812 | 4/1972 | Lee | 30/162 |
| 4,663,846 | 5/1987 | Takayama | 30/162 |
| 4,713,885 | 12/1987 | Keklak et al. | 30/335 X |
| 4,868,985 | 9/1989 | Rehm | 30/162 |
| 5,001,834 | 3/1991 | Collins | 30/162 X |
| 5,303,474 | 4/1994 | Keklak et al. | 30/162 |
| 5,370,654 | 12/1994 | Abidin et al. | 30/162 |
| 5,391,177 | 2/1995 | Schwartz | 30/162 |

FOREIGN PATENT DOCUMENTS

| | | | |
|---|---|---|---|
| 2 253 805 | 9/1992 | United Kingdom | 30/335 |

*Primary Examiner*—Mark A. Osele

*Attorney, Agent, or Firm*—David L. Volk; Brendan B. Dix

[57] ABSTRACT

The present invention relates to a hand held label removal apparatus which provides a safe, reliable means for removing labels and safety seals from containers. A trigger actuated needle like cutter is manually exposed to penetrate the surface of a label and thereby remove it from the surface of a container. In addition, the cutter may be used to remove foil seals and plastic packaging found on many consumer packaging. Designed to be made from various colors of plastic, the apparatus provides a simple, inexpensive means for the user to remove labels from recyclable containers. Also, when the label is not in use, the cutter automatically retracts, thereby, preventing accidental harm to a person.

1 Claim, 2 Drawing Sheets

LABEL REMOVAL APPARATUS

BACKGROUND OF THE INVENTION

1. Field of the Invention

The present invention relates to a label removal apparatus. More particularly, the present invention relates to label removal from labels normally glued or pasted on containers and which must be removed for the recycling of the container.

2. Description of the Prior Art

Within present plastic material reclamation technology, equipment has been developed to remove adhesively backed labels from granulated plastic scrap. In particular, granulated material from plastic products such as milk jugs, oil containers, etc. will have label remnants adhering to the plastic granulate subsequent to the granulation process. This fiber (paper label) or film (plastic label) material must be removed prior to the final reprocessing into usable plastic pellets.

Within the plastic reprocessing industry a number of processes with the objective of label removal have been developed. A particular concern to this invention is a so called "kinetic" process developed by Partek Corp. of Vancouver, Wash., issued as U.S. Pat. No. 5,110,055. The apparatus proper is identified as a "refiner." The Partek process uses a rotating flat faced blade within a containment vessel to flail the granulate and separate the fibrous label material.

When putting new price labels on previously labeled items, it is desirable to also remove the old label. Placing the new label on top of the old label is generally considered to be bad merchandising. It alerts the consumer to a change in price and might lead the consumer to believe that the retailer's stock is old or expired. Additionally, consumers might peel off the old label and attempt to purchase at an incorrect price.

Consequently, when relabeling goods, it is generally necessary to scrape off the old label. A number of existing scrapers have been designed for this purpose, such as the scrapers disclosed in U.S. Pat. Nos. 4,128,452 and 4,248,660. Each of these scrapers includes a scraping blade mounted to a handle to enable the user to hold the scraper by the handle and peel off a label with the blade disclosed in U.S. Pat. No. 4,248,660. Scraper blades are preferably fabricated of self-lubricating plastic material, so labels do not adhere to the blade after they are removed from the merchandise. Blades fabricated of such material eliminate the need for separate lubricating apparatus, is the one disclosed in U.S. Pat. No. 4,128,452.

Numerous innovations for a label removing apparatus have been provided in the prior art that are described as follows. Even though these innovations may be suitable for the specific individual purposes to which they address, they differ from the present invention as hereinafter contrasted.

Container washing apparatus arranged for controlling the handling of the labels as they detach from the containers. It is also used for collecting the labels in spaced zones which are in communication through a system of transfer passages and baffles so fluid flow directing nozzles will be effective to move the labels in an orderly and substantially non-turbulent manner to an outlet connected to an apparatus for separating the labels and returning the washing solution for reuse.

The above invention differs significantly from the present invention because the above cited patent is intended to be used on large bottle washing machines and provide no means for portable or hand held use.

Another important distinction between this invention and the present invention is the method used to remove a label from a bottle. The above invention essentially washes the label off the bottle and then handles the waste label through special means. The present invention removes a label from a container by a finger actuated needle-like cutter mechanism.

This method is an improvement of an existing apparatus and method employed to remove paper or plastic film labels from plastic blow molded bottle scrap. Mechanical improvements have been made in two areas. The first area of improvement consists of the addition of multiple stages to the vertically mounted rotating blade assembly and cooperating multiple stationary elements within the stator assembly. The second area of improvement is within the air induction system and consists of improvements of the flow and control of the air stream which entrains the waste from the process mass. The method of improvement of this invention results from the employment of these mechanical advancements.

The above invention differs significantly from the present invention because the above cited patent is intended to be used on large container reclamation machines and provide no means for portable or hand held use for the general public. Additionally, the above cited patent uses a very large and heavy cutter mechanism, as well as, a complex air circulation method to handle the waste label. The present invention is designed for home use and has a simple lightweight needle-like cutter to remove labels from containers. Still further, the present invention provides the added utility of being able to open plastic shrink-wrap packages and foil seals found today on many consumer products.

A scraper adapted to be mounted on the bottom of a labeling gun handle is provided. A scraper blade handle preferably faces forward to enable labels to be removed and applied in a two-stroke motion. The blade and/or receptacle for housing removed labels is preferably removable and discardable.

The above invention differs significantly from the present invention because the above cited patent is intended to be used by grocery store personnel in combination with a price marking apparatus. Additionally, the above cited patent uses a very large knife like cutting mechanism which requires some form of handle mounting provision by a separate apparatus. The present invention is designed for home use and has a simple lightweight trigger actuated needle-like cutter to remove labels from containers. Still further, the present invention provides the added utility of being able to open plastic shrink-wrap packages and foil seals found today on many consumer products.

An apparatus is described for removing and collecting labels from bottles while the bottles are being cleaned prior to being fed into a filling line in a bottling plant. During cleaning, the bottles are transported in an inverted position in pockets of a pocket conveyor through a series of caustic baths. To avoid contaminating these baths with freed labels, they are removed by sprays while the bottles travel between a pair of baths. This novel device includes downwardly directed liquid for spraying rinsing solution on the bottles and a collecting trough beneath the sprays and pockets to collect the rinsing solution and labels. To permit free passage of the labels out of the pockets, a cam mechanism is provided which lifts the bottle shoulders out of engagement with the pockets while the labels are being removed.

The above invention differs significantly from the present invention because the above cited patent is intended to be used on very large bottle washing machines and provide no means for portable or hand held use. Another important distinction between this invention and the present invention is the method used to remove a label from a container. The above invention essentially washes the label off the bottle and then handles the waste label through special means. The present invention removes a label from a container by a finger actuated needle-like cutter mechanism. Still further, the present invention provides the added utility of being able to open plastic shrink-wrap packages and foil seals found today on many consumer products.

SUMMARY OF THE INVENTION

The present invention relates to a hand held label removal apparatus. More particularly, the preferred embodiment provides a safe, portable, hand held device that contains a trigger actuated needle to effectively scrape a paper or plastic label from the surface of a container.

Today's environmentally conscious consumer realizes that recycling is an effective means to reduce pollution and conserve our environment. Many towns and villages have gone so far as to pass legislation requiting residents to recycle certain materials. Almost all containers have some type of externally applied paper or plastic label. These labels are very troublesome during the recycling process, therefore, they need to be removed from the container prior to the recycling process. To date, most consumers who must remove such labels resort to soaking and then scraping or attempt to scrape the dry label off the container. This results in various levels of success and cleanliness.

The preferred embodiment provides a simple method of removing stubborn, adhesive backed labels from recyclable containers. In addition, the present invention also provides a means for removing foil and plastic seals found on many packages today as tamper resistance devices. The cutter on the preferred embodiment easily penetrates such labels and seals that allows the user to remove and discard the unwanted labels and seals. In addition to the utility of the preferred embodiment, it also contains important safety features which will prevent accidental injury from an exposed cutter, Therefore, the preferred embodiment can be used in a typical household without fear of injury.

Accordingly, it is an objective of the present invention to provide a small, safe, and easy to use label remover which can be utilized to remove labels from the exterior of containers.

More particularly, it is an objective of the present invention to provide the user with an efficient means of removing glue backed labels from any surface cleanly and safely.

In keeping with these objectives, and with others which will become apparent hereinafter, one feature of the present invention resides in regards to the cutter that is extended and retracted by the user squeezing and releasing the label remover trigger.

In accordance with another feature of the present invention, an apparatus is provided which can easily and safely pierce plastic shrink wrapping and foil seals present on many packages.

Another feature of the present invention is that the curing means is automatically reset to a retracted and unexposed position, thereby eliminating any chance of accidental harm to people.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing.

BRIEF LIST OF REFERENCE NUMERALS UTILIZED IN THE DRAWING

10—trigger label removal apparatus 10

12—trigger label removal apparatus housing 12

12A—trigger label removal apparatus housing closure guide means 12A

12B—trigger label removal apparatus handle means 12B

12C—trigger label removal apparatus barrel 12C

12D—trigger label removal apparatus cutter guide means 12D

14—trigger label removal apparatus lever means 14

14A—trigger label removal apparatus lever means top 14A

14B—trigger label removal apparatus lever means bottom 14B

14C13 trigger label removal apparatus lever means pivot 14C

14D—trigger label removal apparatus cutter connection 14D

14E—trigger label removal apparatus lever means engaged 14E

14F—trigger label removal apparatus lever means released 14F

16—trigger label removal apparatus cutter means 16

16A—trigger label removal apparatus cutter means bottom 16A

16B—trigger label removal apparatus cutter means connection 16B

16C—trigger label removal apparatus returning means 16C

16D—trigger label removal apparatus cutter means extended position 16D

16E—trigger label removal apparatus cutter means retracted position 16E

100—button label removal apparatus 100

112—button label removal apparatus housing 112

112A—button label removal apparatus housing closure guide means 112A

112B—button label removal apparatus handle means 112B

112C—button label removal apparatus barrel 112C

112D—button label removal apparatus cutter guide means 112D

114—button label removal apparatus lever means 114

114A—button label removal apparatus lever means top 114A

114B—button label removal apparatus lever means bottom 114B

114C—button label removal apparatus return means 114C

114D—button label removal apparatus cutter connection 114D

116—button label removal apparatus cutter means 116

116A—button label removal apparatus cutter means bottom 116A

116B—button label removal apparatus cutter means connection 116B

DETAILED LIST OF REFERENCE NUMERALS UTILIZED IN THE DRAWING

10—trigger label removal apparatus 10 comprising: a trigger label removal apparatus housing 12, a trigger label removal apparatus lever means 14, and a trigger label removal apparatus cutting means 16;

12—trigger label removal apparatus housing 12 comprising: a plurality of trigger label removal apparatus housing closure guide means 12A mounted securely along the periphery of said trigger label removal apparatus housing 12, still further having a trigger label removal apparatus handle means 12B appropriately shaped at one end of said trigger label removal apparatus housing 12 for interface with a human hand, still further having a trigger label removal apparatus barrel 12C located at one distal end of said trigger label removal apparatus housing 12 acting in conjunction with a trigger label removal apparatus cutter guide means 12D to fixedly guide a trigger label removal apparatus cutter means 16;

12A—trigger label removal apparatus housing closure guide means 12A mounted securely along the periphery of a trigger label removal apparatus housing 12 acting to maintain alignment and closure of said trigger label removal apparatus housing 12;

12B—trigger label removal apparatus handle means 12B appropriately shaped at one end a rigger label removal apparatus housing 12 for interface with a human hand;

12C—trigger label removal apparatus barrel 12C located at one distal end of a trigger label removal apparatus housing 12 acting in conjunction with trigger label removal apparatus cutter guide means 12D to locate and guide a trigger label removal apparatus cutter means 16;

12D—trigger label removal apparatus cutter guide means 12D located within a trigger label removal apparatus housing 12 functioning to guide a trigger label removal apparatus cutter means 16 therein;

14—trigger label removal apparatus lever means 14 rotatably mounted on a trigger label removal apparatus housing 12 comprising: a trigger label removal apparatus lever means top 14A, located at one distal end of said trigger label removal apparatus lever means 14 acting to rotate said trigger label removal apparatus lever means 14 in a clockwise direction, further having a trigger label removal apparatus lever means top 14B located at opposite distal end of said trigger label removal apparatus lever means 14 to move a trigger label removal apparatus cutter means 16 in both an extended and retracted direction, still further comprising: a trigger label removal apparatus lever means pivot 14C securely mourned between said trigger label removal apparatus lever means top 14A and said trigger label removal apparatus lever means top 14B thereby causing rotation of said trigger label removal apparatus lever means 14 about said trigger label removal apparatus lever means pivot 14C, and still further comprising a trigger label removal apparatus cutter connection 14D located at said trigger label removal apparatus ever means top 14B and securing said trigger label removal apparatus cutter means 16 to said trigger label removal apparatus lever means 14;

14A—trigger label removal apparatus lever means bottom 14A located at one distal end of a trigger label removal apparatus lever means 14 acting to rotate said trigger label removal apparatus lever means 14 in a clockwise direction;

14B—trigger label removal apparatus lever means top 14B located at one distal end of a trigger label removal apparatus lever means 14 acting to move a trigger label removal apparatus cutter means 16 in both an extended and retracted direction;

14C—trigger label removal apparatus lever means pivot 14C securely mounted between a trigger label removal apparatus lever means top 14A and a trigger label removal apparatus lever means bottom 14B thereby allowing rotation of a trigger label removal apparatus lever means 14;

14D—trigger label removal apparatus cutter connection 14D located at top of a trigger label removal apparatus lever means 14 and securing a trigger label removal apparatus cutter 16 to a trigger label removal apparatus lever means 14;

14E—trigger label removal apparatus lever means engaged 14E acting to rotate a trigger label removal apparatus lever means 14 in a clockwise direction thereby extending said trigger label removal apparatus cutter means 16 from a trigger label removal apparatus barrel 12C;

14F—trigger label removal apparatus lever means released 14F acting to rotate a trigger label removal apparatus lever means 14 in a counter clockwise direction and retracting a trigger label removal apparatus cutter means 16 into a trigger label removal apparatus barrel 12C;

16—trigger label removal apparatus cutter means 16 comprising a trigger label removal apparatus cutter means connection 16B located at one distal end of said trigger label removal apparatus cutter means 16 securely mounting said trigger label removal apparatus cutter means 16 to a trigger label removal apparatus cutter connection 14D, further comprising a trigger label removal apparatus returning means 16C collapsably located therebetween a trigger label removal apparatus barrel 12C and a trigger label removal apparatus lever means top 14B acting to rotate a trigger label removal apparatus lever means 14 to a trigger label removal apparatus cutter means retracted position 16E;

16A—trigger label removal apparatus cutter means bottom 16A located at one end of a trigger label removal apparatus housing 12 thereby allowing a trigger label removal apparatus cutter means 16 to extend and retract from said trigger label removal apparatus housing 12;

16B—trigger label removal apparatus cutter means connection 16B located at one distal end of a trigger label removal apparatus cutter means 16 securely mounting said trigger label removal apparatus cutter means 16 to a trigger label removal apparatus cutter connection 14D;

16C—trigger label removal apparatus returning means 16C collapsably located between a trigger label removal apparatus barrel 12C and a trigger label removal apparatus lever means top 14B acting to rotate a trigger label removal apparatus lever means 14 to a trigger label removal apparatus cutter means retracted position 16E;

16D—trigger label removal apparatus cutter means extended position 16D thereby exposing a trigger label removal apparatus cutter means 16 from a trigger label removal apparatus housing 12;

16E—trigger label removal apparatus cutter means retracted position 16E thereby shielding a trigger label removal apparatus cutter means 16 into a trigger label removal apparatus housing 12;

100—button label removal apparatus 100 comprising: a button label removal apparatus housing 112, a button label removal apparatus lever means 114, and a button label removal apparatus cutter means 116;

112—button label removal apparatus housing 112 comprising: a plurality of button label removal apparatus housing closure guide means 112A mounted securely along the periphery of said button label removal apparatus housing 112, still further having a button label removal apparatus handle means 112B appropriately shaped at one end of said button label removal apparatus housing 112 for interface with a human hand, still further having a button label removal apparatus barrel 112C located at one distal end of said button label removal apparatus housing 112 acting in conjunction with a button label removal apparatus cutter guide means 112D to fixedly guide a button label removal apparatus cutter means 116, further having a button label removal apparatus housing boss 112E mounted securely inside of said button label removal apparatus housing 112 acting to limit travel of said button label removal apparatus cutter means 116 and a button label removal apparatus mounted securely inside of said button label removal apparatus housing acting to restrain a button label removal apparatus return means 114C;

112A—button label removal apparatus housing closure guide means 112A mounted securely along the periphery of a button label removal apparatus housing 112 acting to maintain alignment and closure of said button label removal apparatus housing 112;

112B—button label removal apparatus handle means 112B appropriately shaped at one end a button label removal apparatus housing 112 for interface with a human hand;

112C—button label removal apparatus barrel 112C located at one distal end of a button label removal apparatus housing 112 acting in conjunction with a button label removal apparatus housing cutter guide means 112D to locate and guide a button label removal apparatus cutter means 116;

114—button label removal apparatus lever means 114 slidably mounted inside of a button label removal apparatus housing 112 comprising a button label removal apparatus lever means bottom 114A located at one distal end of said button label removal apparatus lever means 114, further having a button label removal apparatus lever means top 114B located at opposite distal end of said button label removal apparatus lever means 114 acting to move a button label removal apparatus cutter means 116 in both an extended and retracted direction, and still further comprising a button label removal apparatus cutter connection 114D located at said button label removal apparatus lever means top 114B and securing button label removal apparatus said cutter 116 to said button label removal apparatus lever means 114;

114A—button label removal apparatus lever means bottom 114A located at one distal end of a button label removal apparatus lever means 114;

114B—button label removal apparatus lever means top 114B located at one distal end of a button label removal apparatus lever means 114 thereby acting to move a button label removal apparatus cutter means 116 in both an extended and retracted direction;

114D—button label removal apparatus cutter connection 114D located at top of button label removal apparatus lever means 114 and securing a button label removal apparatus cutter 116 to a button label removal apparatus lever means 114;

116—button label removal apparatus cutter means 116 comprising a button label removal apparatus cutter means bottom 116B located at one distal end of said button label removal apparatus cutter means 116 securely mounting said button label removal apparatus cutter means 116 to a button label removal apparatus cutter connection 114D, further comprising a button label removal apparatus return means 114C collapsably located therebetween a button label removal apparatus barrel 112C and a button label removal apparatus lever means top 114B acting to rotate a button label removal apparatus lever means 114 to said button label removal apparatus cutter means to a retracted position, still further having a button label removal apparatus cutter means bottom 116A located at one end of a button label removal apparatus cutter means 116 thereby allowing said button label removal apparatus cutter means 116 to remove a label;

116A—button label removal apparatus cutter means bottom 116A located at one end of a button label removal apparatus cutter means 116 thereby allowing a button label removal apparatus cutter means 116 to remove a label; and

116B—button label removal apparatus cutter means connection 116B located at one distal end of a button label removal apparatus cutter means 116 securely mounting said button label removal apparatus cutter means 116 to a button label removal apparatus cutter connection 114D thereby causing said button label removal apparatus cutter means 116 to communicate with a button label removal apparatus lever means 114.

BRIEF DESCRIPTION OF THE PREFERRED EMBODIMENT

DETAILED DESCRIPTION OF THE PREFERRED EMBODIMENT

Figure 1:
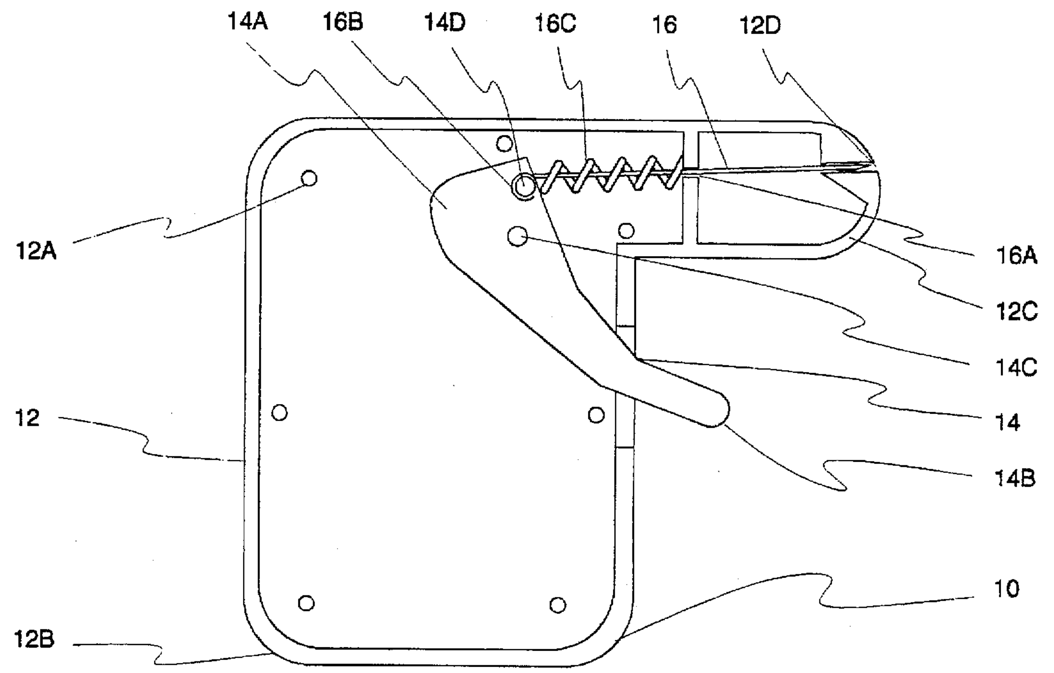
FIG. 1 is a cross-sectional side view of the label removal apparatus depicting the general position of the various parts which comprise the hand held gun-like label remover apparatus.

First, referring to FIG. 1 which is a cross-sectional top view of the trigger label removal apparatus exhibiting the following features. A trigger label removal apparatus 10 comprising a trigger label removal apparatus housing 12, a trigger label removal apparatus lever means 14, and a trigger label removal apparatus cutter means 16. The trigger label removal apparatus housing 12 comprising a plurality of trigger label removal apparatus housing closure guide means 12A mounted securely along the periphery of said trigger label removal apparatus housing 12, still further having a trigger label removal apparatus handle means 12B appropriately shaped at one end of said trigger label removal apparatus housing 12 for interface with a human hand, still further having a barrel 12C located at one distal end of said trigger label removal apparatus housing 12 acting in conjunction with a trigger label removal apparatus cutter guide means 12D to fixedly guide a trigger label removal apparatus cutter means 16. The trigger label removal apparatus lever means 14 rotatably mounted on trigger label removal apparatus said housing 12 having a trigger label removal apparatus lever means top 14A located at one distal end of said trigger label removal apparatus lever means 14, further having a trigger label removal apparatus lever means top 14B located at opposite distal end of said trigger label removal apparatus lever means 14 acting to move a trigger label removal apparatus cutter means 16 in both an extended and retracted direction, still further having a trigger label removal apparatus lever means pivot 14C securely mounted between said trigger label removal apparatus lever means top 14A and said trigger label removal apparatus lever means bottom 14B thereby causing rotation of said trigger label removal apparatus lever means 14 about said trigger label removal apparatus lever means pivot 14C, and still further having a trigger label removal apparatus cutter connection 14D located at said trigger label removal apparatus lever means bottom 14B and securing said trigger label removal apparatus cutter 16 to said trigger label removal apparatus lever means 14. The trigger label removal apparatus cutter means 16 having a trigger label removal apparatus cutter means connection 16B located at one distal end of said trigger label removal apparatus cutter means 16 securely mounting said trigger label removal apparatus cutter means 16 to said trigger label removal apparatus cutter connection 14D, still further having a trigger label removal apparatus returning means 16C collapsably located therebetween said trigger label removal apparatus barrel 12C and said trigger label removal apparatus lever means top 14B acting to rotate said trigger label removal apparatus lever means 14 to a retracted position. The trigger label removal apparatus cutter means 16 still further having a trigger label removal apparatus cutter means bottom 16A located at one end of said trigger label removal apparatus housing 12 thereby allowing said trigger label removal apparatus cutter means 16 to extend and retract from said trigger label removal apparatus housing 12 and still further having a trigger label removal apparatus cutter means connection 16B located at one distal end of said trigger label removal apparatus cutter means 16 securely mounting said trigger label removal apparatus cutter means 16 to a trigger label removal apparatus cutter connection 14D.

Figure 2:
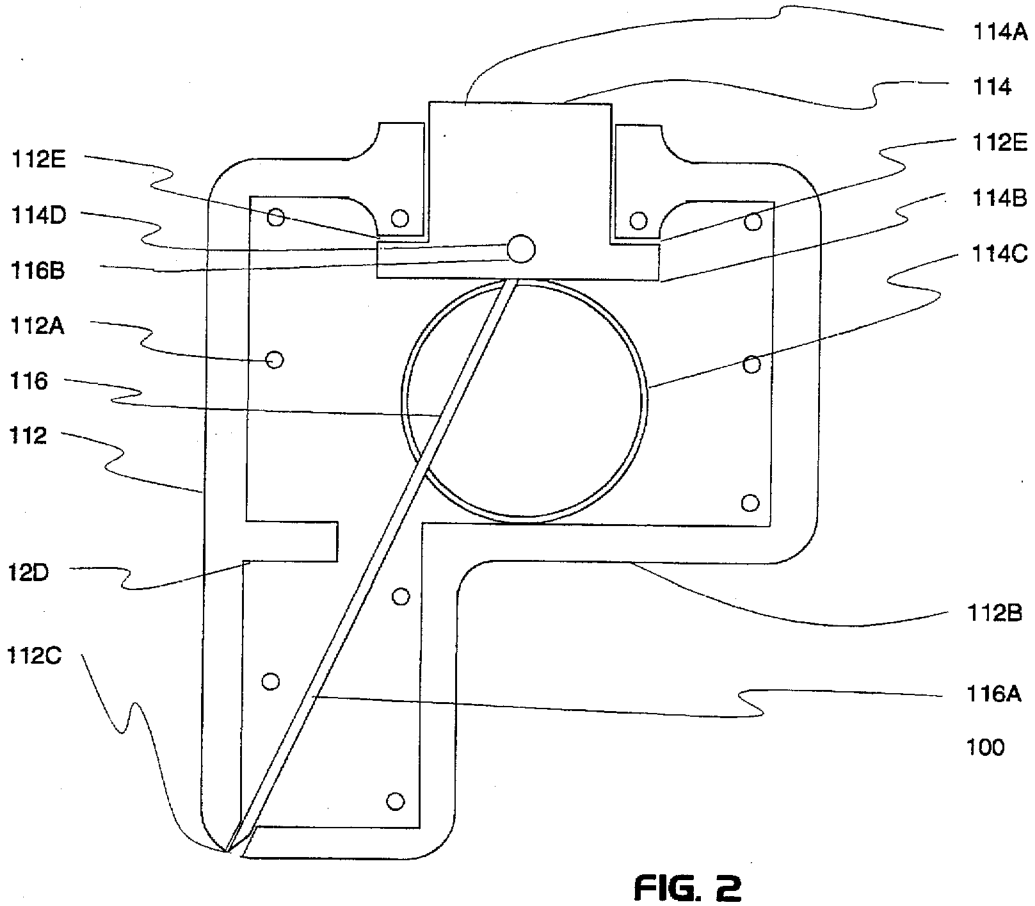
FIG. 2 is a cross-sectional side view of a button label removal apparatus depicting a thumb actuated needle design for the hand held label remover apparatus.

Now referring to FIG. 2 which is a cross-sectional plan view of a button label removal apparatus depicting a thumb actuated needle design for the hand held label remover apparatus exhibiting the following features. A button label removal apparatus 100 comprising a button label removal apparatus housing 112, a button label removal apparatus lever means 114, and a button label removal apparatus cutter means 116. The button label removal apparatus housing 112 comprising a plurality of button label removal apparatus housing closure guide means 112A mounted securely along the periphery of said button label removal apparatus housing 112, still further having a button label removal apparatus handle means 112B appropriately shaped at one end of said button label removal apparatus housing 112 for interface with a human hand, still further having a button label removal apparatus barrel 112C located at one distal end of said button label removal apparatus housing 112 acting in conjunction with a button label removal apparatus cutter guide means 112D to fixedly guide a button label removal apparatus cutter means 116, still further having a button label removal apparatus housing boss 112E securely mounted inside of said button label removal apparatus housing 112 acting to limit travel of said button label removal apparatus lever means 114, securely mounted inside of said button label removal apparatus housing 112 functioning to engage a button label removal apparatus return means 114C. The button label removal apparatus lever means 114 slidably mounted inside of said button label removal apparatus housing 112 comprising a button label removal apparatus lever means bottom 114A located at one distal end of said button label removal apparatus lever means 114, further having a button label removal apparatus lever means top 114B located at opposite distal end of said button label removal apparatus lever means 114 acting to move said button label removal apparatus cutter means 116 in both an extended and retracted direction, and still further comprising a button label removal apparatus cutter connection 114D located at said button label removal apparatus lever means top 114B and securing said button label removal apparatus cutter 116 to said button label removal apparatus lever means 114. The button label removal apparatus cutter means 116 comprising a button label removal apparatus cutter means bottom 116B located at one distal end of said button label removal apparatus cutter means 116 securely mounting said button label removal apparatus cutter means 116 to said button label removal apparatus cutter connection 114D, further having a button label removal apparatus return means 114C collapsably located therebetween a button label removal apparatus barrel 112C and a button label removal apparatus lever means top 114B acting to move said button label removal apparatus lever means 114 thereby positioning said button label removal apparatus cutter means 116 in a retracted position, still further having a button label removal apparatus cutter means bottom 116A located at one end of a button label removal apparatus cutter means 116 thereby allowing a button label removal apparatus cutter means 116 to remove a label.

Figure 3:
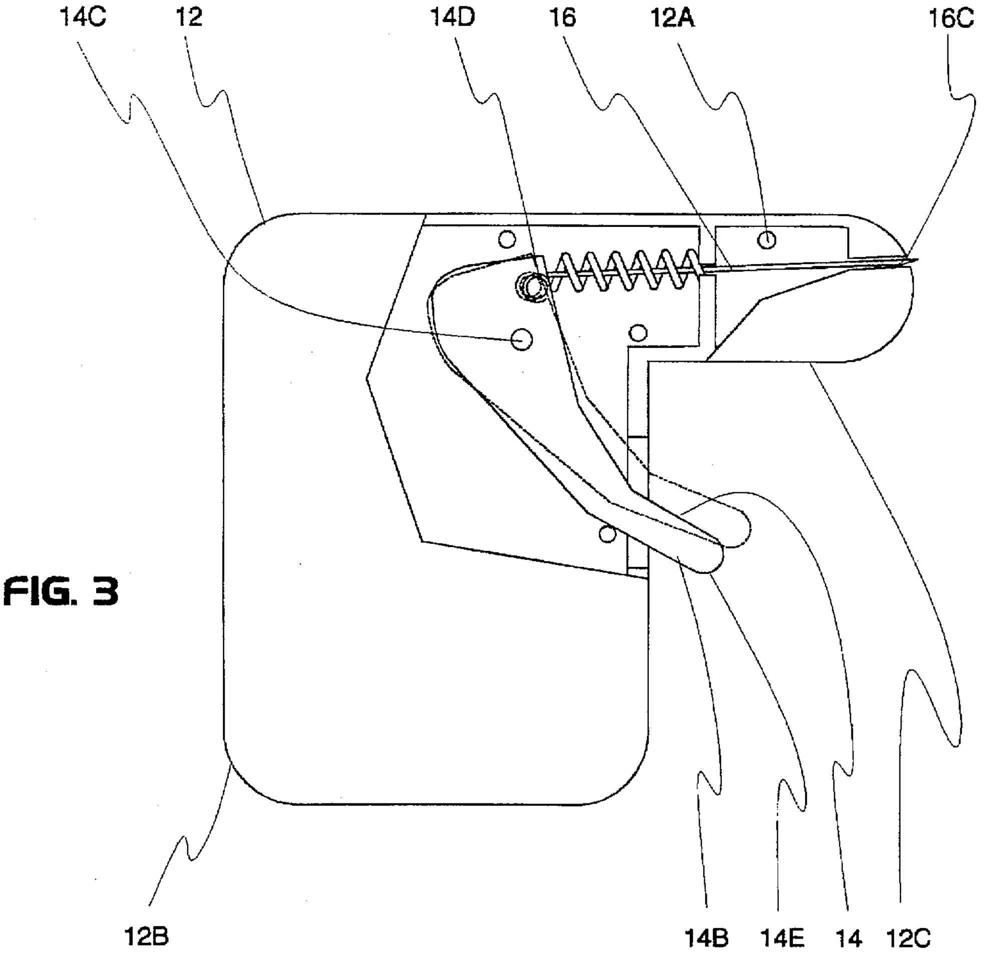
FIG. 3 is a partial cross sectional side view of the trigger label removal apparatus with the lever means in the depressed position thereby exposing the cutter means from the housing.

Now referring to FIG. 3 which is a partial section view of the first preferred embodiment with the lever means in the depressed position exhibiting the following features. A trigger label removal apparatus lever means engaged 14E acting to rotate said trigger label removal apparatus lever means 14 in a clockwise direction thereby extending said trigger label removal apparatus cutter means 16 from said trigger label removal apparatus barrel 12C.

Figure 4:
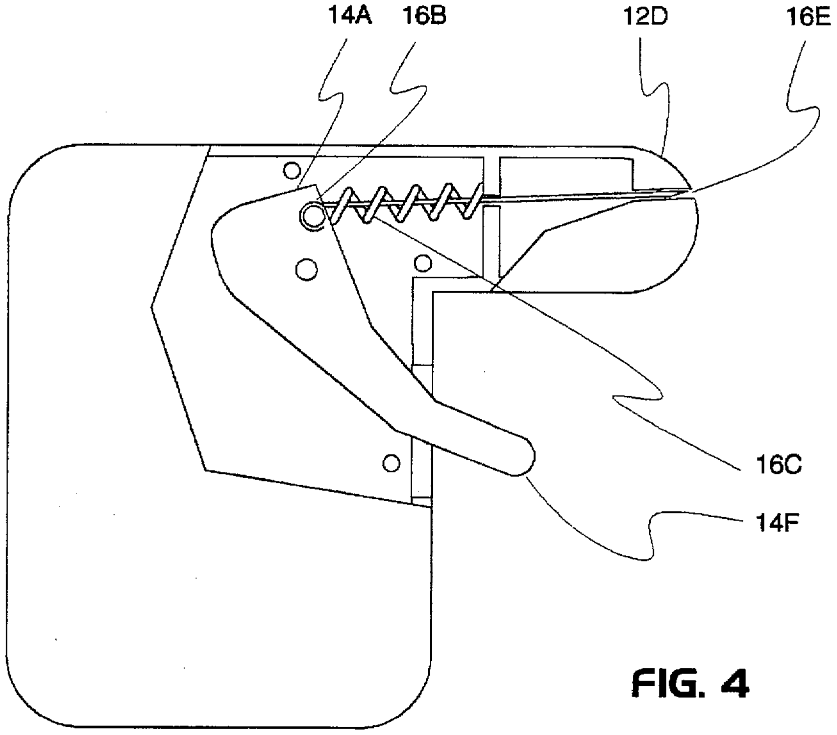
FIG. 4 is a partial cross sectional side view of the trigger label removal apparatus with the lever means in the released and retracted position thereby concealing the cutter means inside of the housing.

Now referring to FIG. 4 which is a partial section view of the trigger label removal apparatus with the lever means in the released and retracted position exhibiting the following features. A trigger label removal apparatus lever means released 14F acting to rotate said trigger label removal apparatus lever means 14 in a counter clockwise direction and retracting said trigger label removal apparatus cutter means 16 into said trigger label removal apparatus barrel 12C.

Now referring to FIGS. 1, 3 and 4, the first preferred embodiment of a small hand held trigger label removal apparatus 10 can be seen. The operation of said trigger label removal apparatus 10 is quick and simple, providing a safe means to remove a label from the exterior of a container. To use the apparatus, the user places the trigger label removal apparatus barrel 12C in close proximity to the container label and depresses the trigger label removal apparatus lever means 14 at the trigger label removal apparatus lever means top 14A. This force rotates said trigger label removal apparatus lever means 14 in a clockwise direction about the trigger label removal apparatus lever means pivot 14C and this thereby extends the trigger label removal apparatus cutter means 16 from the trigger label removal apparatus housing 12. If the container label is placed properly, the trigger label removal apparatus cutter means bottom 16 A will penetrate the label material, thereby scraping said label from the surface of the container. Once the user releases the trigger label removal apparatus lever means 14, the trigger label removal apparatus returning means 16C will act to expand and rotate said trigger label removal apparatus lever means 14 in a counter-clockwise direction about said trigger label removal apparatus lever means pivot 14C. This rotation causes said trigger label removal apparatus cutter means 16 to retract into said trigger label removal apparatus housing 12 and resets the trigger label removal apparatus lever means 14 for another actuation by the user. To remove the label, the user must operate said trigger label removal apparatus lever means 14 a multitude of times while at the same time repositioning said trigger label removal apparatus barrel 12C so that the tiger label removal apparatus cutter means bottom 16A penetrates into an unaffected area of the label. The trigger label removal apparatus is designed to be used and held like a gun, with a spring loaded trigger mechanism comprising the trigger label removal apparatus lever means 14. This arrangement provides a comfortable trigger label removal apparatus 10. Once the user is finished removing the label, the trigger label removal apparatus return means 16C will act to retract the sharp trigger label removal apparatus cutter means 16 into said trigger label removal apparatus barrel 12C, thereby allowing easy storage without fear of accidental injury from an exposed trigger label removal apparatus cutter means 16.

In addition to removing labels, the user may use the label removal apparatus in a similar manner as just described to remove plastic shrink wrapping and foil seals from consumer packages.

Referring now to FIG. 2, which depicts a button label removal apparatus which differs slightly from the trigger label removal apparatus. In this second preferred embodiment, the button label removal apparatus housing 112 is shaped to hand held and the button label removal apparatus lever means 114 is located on said button label removal apparatus housing 112 to be actuated by the user's thumb. In addition to this difference, the button label removal apparatus return means 114C is also different. The button label removal apparatus return means 114C is integral to the button label removal apparatus lever means bottom 114B and is essentially an elongated projection of thermoplastic material which when collapsed tends to have an expanding force acting against said button label removal apparatus lever means bottom 114B. To use the second preferred embodiment of a button label removal apparatus 110, the user simple holds the button label removal apparatus barrel 112C in close proximity to the label to be removed and presses the button label removal apparatus lever means top 114A. This pressing force extends the button label removal apparatus cutter means 116 from said button label removal apparatus barrel 112C and allows button label removal apparatus cutter means bottom 116A to penetrate the label, thereby removing it from the container. When the user releases the button label removal apparatus lever means 114, the button label removal apparatus return means 114C expands and returns the button label removal apparatus lever means top 114A to its fully exposed position and retracts said button label removal apparatus cutter means 116 inside of said button label removal apparatus housing 112. To remove the label, the user must operate said button label removal apparatus lever means 114 a multitude of times while at the same time repositioning said button label removal apparatus barrel 112C so that the button label removal apparatus cutter means bottom 116A penetrates into an unaffected area of the label. This arrangement provides a comfortable button label removal apparatus 100. Once the user is finished removing the label, the button label removal apparatus return means 114C will act to retracted the sharp button label removal apparatus cutter means 116 into said button label removal apparatus barrel 112C, thereby allowing easy storage without fear of accidental injury from an exposed button label removal apparatus cutter means 116.

In addition to removing labels, the user may use the label removal apparatus in a similar manner as just described to remove plastic shrink wrapping and foil seals from consumer packages.

It will be understood that each of the elements described above, or two or more together, may also find a useful application in other types of constructions differing from the type described above.

While the invention has been illustrated and described as embodied in a label removing apparatus, it is not intended to be limited to the details shown, since it will be understood that various omissions, modifications, substitutions and changes in the forms and details of the device illustrated and in its operation can be made by those skilled in the art without departing in any way from the spirit of the present invention.

What is claimed as new and desired to be protected by Letters Patent is set forth in the appended claims.

I claim:

1. A cutting apparatus comprising:

a) a housing including a handle portion and a barrel portion;

b) the handle portion having a first wall disposed opposite a second wall, the barrel portion connected to the second wall;

c) a lever means slidably connected to the first wall of the handle portion;

d) the lever means having a first end disposed opposite a second end, the first end being accessible by a user from outside of the housing, the second end being disposed within the handle portion of the housing;

e) a cutter means connected to the second end of the lever means and extending into the barrel portion;

f) an elongated round return means disposed between and in physical communication with the lever means and the second wall, the return means configured and positioned to compress in a radial direction with respect to itself when the lever means is pressed by a user toward the second wall, thereby permitting the cutter means to extend through a distal end of the barrel portion; and g) the return means further configured to expand in a radial direction with respect to itself when the lever means is released by such a user.

* * * * *